United States Patent
Lee et al.

(10) Patent No.: US 10,207,612 B2
(45) Date of Patent: Feb. 19, 2019

(54) LOCKING STRUCTURE FOR ARMREST

(71) Applicants: Hyundai Motor Company, Seoul (KR); Kia Motors Corporation, Seoul (KR); Hyundai Dymos Incorporated, Seosan, Chungcheongnam (KR)

(72) Inventors: Hoon-Bok Lee, Seoul (KR); Tae-Hoon Lee, Seoul (KR); Sang-Do Park, Suwon (KR); Sang-Hark Lee, Incheon (KR); Mi-Sun Kwon, Seoul (KR); Yun-Ho Kim, Osan (KR); Dong-Hwan Kim, Hwaseong (KR); Myeong-Sub Kim, Seongnam (KR); Gi-Tae Jo, Hwaseong (KR); Jun-Kyu Kim, Hwaseong (KR); Yeon-Min Choi, Hwaseong (KR); Jin-Ho Seo, Yongin (KR); Seong-Cheol An, Hwaseong (KR)

(73) Assignees: Hyundai Motor Company, Seoul (KR); Kia Motors Corporation, Seoul (KR); Hyundai Dymos Incorporated, Seosan, Chungcheongnam-do (KR)

( * ) Notice: Subject to any disclaimer, the term of this patent is extended or adjusted under 35 U.S.C. 154(b) by 304 days.

(21) Appl. No.: 15/145,282

(22) Filed: May 3, 2016

(65) Prior Publication Data
US 2017/0158097 A1    Jun. 8, 2017

(30) Foreign Application Priority Data
Dec. 4, 2015    (KR) .................. 10-2015-0172054

(51) Int. Cl.
*B60N 2/75* (2018.01)
*F16C 1/10* (2006.01)

(52) U.S. Cl.
CPC ............. *B60N 2/757* (2018.02); *F16C 1/10* (2013.01)

(58) Field of Classification Search
CPC ........ B60N 2/753; B60N 2/767; B60N 2/757; F16C 1/10
(Continued)

(56) References Cited

U.S. PATENT DOCUMENTS 5,433,503 A * 7/1995 De Filippo ............ B60N 2/757
                                                                297/115
6,047,444 A    4/2000 Braun
(Continued)

FOREIGN PATENT DOCUMENTS

JP           05069771 A *  3/1993   ............ B60N 2/433
KR    10-1998-052220 A    9/1998
(Continued)

*Primary Examiner* — Milton Nelson, Jr.
(74) *Attorney, Agent, or Firm* — Mintz Levin Cohn Ferris Glovsky and Popeo, P.C.; Peter F. Corless

(57) ABSTRACT

A locking structure for an armrest is provided to be pivotable to a folded up or a pulled down position. The locking structure includes a locking pin disposed at a fixed position and a catch pivotably coupled to a fixing bracket in an armrest housing, and has an engaging portion formed at a side thereof so that the locking pin enters the engaging portion, and a projection and a recess are formed to be spaced apart from the engaging portion. A latch is coupled to the fixing bracket and has a protruding portion formed at one side of the latch. A knob rotates the latch and when the armrest housing rotates upward, the catch rotates while the locking pin enters the engaging portion to lock rotation of the armrest housing. When the latch is, the locking pin is withdrawn from the catch, to permit the rotation of the armrest housing.

8 Claims, 6 Drawing Sheets

(58) Field of Classification Search
USPC .......................................... 297/411.38, 411.32
See application file for complete search history.

(56) References Cited

U.S. PATENT DOCUMENTS

| | | | | |
|---|---|---|---|---|
| 8,876,213 B2* | 11/2014 | Tame | ................... | B60N 2/4606 |
| | | | | 297/411.38 |
| 2017/0158098 A1* | 6/2017 | An | ....................... | B60N 2/4613 |

FOREIGN PATENT DOCUMENTS

| KR | 1999-0020722 | | 3/1999 |
|---|---|---|---|
| KR | 2002-0066395 | A | 8/2002 |
| KR | 2005-0103898 | A | 11/2005 |
| KR | 10-1417066 | B1 | 7/2014 |
| KR | 10-1488176 | B1 | 1/2015 |
| KR | 2015-0050064 | A | 5/2015 |

* cited by examiner

<FOLDED UP POSITION>     <PULLED DOWN POSITION>

LOCKING STRUCTURE FOR ARMREST

CROSS-REFERENCE TO RELATED APPLICATIONS

This application claims priority under 35 U.S.C. § 119 to Korean Patent Application No. 10-2015-0172054, filed on Dec. 4, 2015, in the Korean Intellectual Property Office, the disclosure of which is incorporated herein by reference in its entirety.

BACKGROUND

1. Field of the Invention

The present invention relates to a locking structure for an armrest installed at a rear seat in a passenger vehicle. More particularly, the present invention relates to a locking structure for a center armrest installed at a center of a rear seat, which prevents an operation defect caused by friction between internal components while performing a locking operation or a releasing operation, and which maintains a locked state more securely even in the event of a rear-end collision of a vehicle.

2. Description of the Related Art

Typically, in the case of a passenger vehicle, unlike a front seat structure in which a driver seat and a front passenger seat are mounted separately, a rear seat has a structure disposed to be elongated within a vehicle width direction to allow at least three persons to be seated in the rear seat. Further, in accordance with the specifications of the vehicle, a (center) armrest may be selectively installed at a center of the rear seat. As illustrated in FIG. 1A of the related art, the armrest may be folded up to ensure a space for seating multiple persons and may be pulled down when one or two persons are seated.

The armrest has a structure in which an armrest housing 1a is pivotably coupled to an armrest bracket 1b fixedly embedded in a backrest 2b of the rear seat so that the armrest housing 1a is placed on a seat 2a, a plurality of buttons for adjusting an interior lamp, an audio system, an air conditioner and the like when the armrest housing 1a is pulled down may be additionally mounted on the armrest, and a ski through structure, which may be partially opened, may be adopted to the armrest bracket 1b to allow for loading of skis or a board (through a trunk room). Meanwhile, to prevent a passenger from being pushed forward due to a rear-end collision when the armrest housing 1a is in a folded up position and the passenger is seated in front of the armrest housing 1a, rotation of the armrest is locked when the armrest is in the folded up position.

Referring to FIG. 1B of the related art, when describing a locking structure for an armrest, fixing plates 9 having apertures are disposed at both sides of the armrest bracket 1b, a knob 3, which is operable from the exterior, is connected with hinge links 6 through a cable 4 inside the armrest housing 1a, and the hinge links 6 are pivotably mounted on the bracket 5 by pulling the cable 4. Further, ends of the hinge links 6 are connected with ends of locking pins 8 coupled to springs, and thus, when the occupant operates the knob 3, the locking pins 8 slide in a longitudinal direction.

Therefore, when the armrest housing 1a is in the folded up position in a state in which the fixing plates 9 mounted to the armrest bracket 1b are fixed, the ends of the locking pins 8 are aligned at positions where the ends of the locking pins 8 may be inserted into the apertures in the fixing plates 9, and when the locking pins 8 are inserted into the apertures, rotation of the armrest housing 1a is locked, and when the locking pins 8 are withdrawn from the apertures by operating the knob 3 in the locked state, the armrest housing 1a is unlocked allowing rotation thereof to a pulled down position.

However, for the structure in the related art, there is a likelihood that the locking pins cannot properly be inserted into the apertures due to a gap formed between the locking pins and the aperture, or alignment is not properly performed. Therefore, the armrest housing may be inadvertently pulled down in the event of a rear-end collision in a case in which a locking operation is not normally performed. Furthermore, friction may occur when the locking pins are inserted into the apertures, and force required to operate the knob may be excessively increased.

SUMMARY

The present invention provides a locking structure for an armrest, capable of being automatically converted to a locked state when an armrest housing is folded up, and allowing a knob to be operable using a minimal amount of force.

An exemplary embodiment of the present invention provides a locking structure for an armrest having an armrest housing mounted on an armrest bracket coupled to a rear seat to be pivotable to a folded up position with an angle parallel to a backrest or a pulled down position with an angle parallel to a seat, the locking structure may include: a locking pin disposed at a fixed position in the armrest bracket; a catch pivotably coupled to a fixing bracket embedded within the armrest housing, and having an engaging portion formed at one side of the catch to allow the locking pin to enter or be inserted into the engaging portion, and a projection and a recess formed to be spaced apart from the engaging portion; a latch pivotably coupled to the fixing bracket when the latch is spaced apart from the catch, and having a protruding portion formed at one side of the latch; and a knob configured to rotate the latch by a wire, in which when the armrest housing rotates to the folded up position, the catch rotates while the locking pin enters the engaging portion, and the latch rotates to cause the protruding portion to support the projection of the catch to lock rotation of the armrest housing, and when the latch is rotated by an operation of the knob, the locking pin may be withdrawn from the catch thus permitting the rotation of the armrest housing.

The catch may be coupled to a spring to maintain the catch rotated to allow the locking pin to enter the engaging portion when the armrest housing is rotated. Additionally, the spring may have two coil portions fitted with a rotation axis of the catch and a rotation axis of the latch, respectively, and may have both ends configured to elastically support rotations of the catch and the latch, respectively.

In the present invention, the projection and the recess formed in the catch may be disposed adjacent to each other, the projection may have an inclined surface formed toward the recess, and a depressed groove, which supports rotation of a protruding portion when the protruding portion is fitted into the depressed groove, may be formed opposite to the inclined surface. Further, the protruding portion may be positioned to be fitted into the recess when the catch is rotated to allow the locking pin to enter the engaging portion. When the catch rotates as the locking pin is inserted into the engaging portion, the protruding portion may slide along the inclined surface, and then the protruding portion may be seated in the depressed groove to prevent rotation of the catch.

In addition, to inhibit the occurrence of abnormal noise, the catch may be made of metal, a damper, which is made of plastic, may be coupled (to constitute a catching portion) to a portion of the catch with which the locking pin comes into contact when the locking pin is in the engaging portion, and a tape, which is made of a material having a smaller frictional coefficient than a material of the locking pin, may be coupled to a surface of the locking pin to prevent a frictional sound from being generated when the locking pin enters the engaging portion and the catch rotates. Further, a flange may protrude from a rim of the fixing bracket to restrict a maximum rotation range of the catch.

According to the present invention having the aforementioned configuration, since a locking operation may be automatically performed when the armrest housing rotates to the folded up position, the risk of a malfunction occurring is prevented, and since only force for rotating the latch is required for the knob, it may be possible to release the locked state using a smaller amount of force. Further, the spring according to the present invention may be a spring including a plurality of apertures into which the catch and the latch are fitted, respectively, and may increase restoring force β of the catch as much as a rotation amount a of the latch (as illustrated in FIG. 7).

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1A:
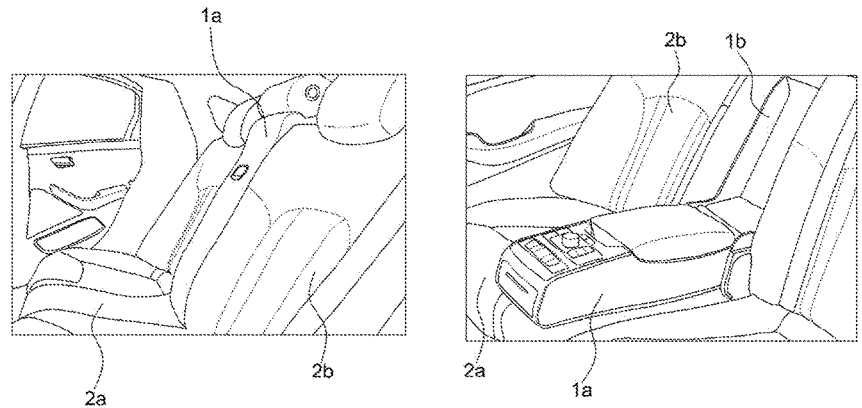
FIG. 1A is a view illustrating a state in which an armrest housing is in a folded up position and a pulled down position according to the related art.
Figure 1B:
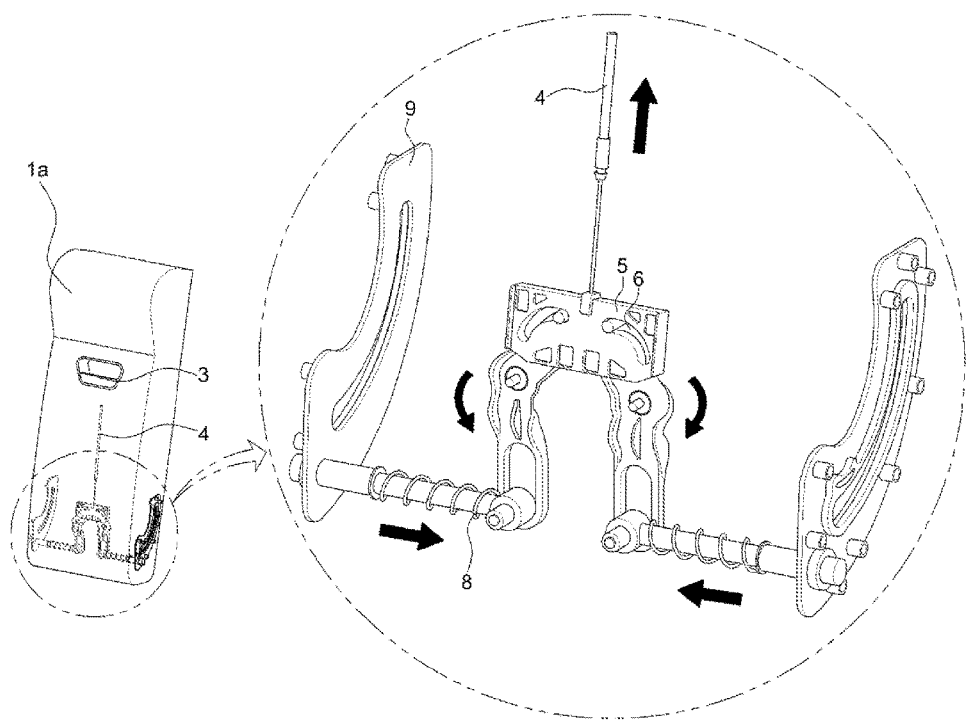
FIG. 1B is a view illustrating a locking structure for an armrest in the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described in detail with reference to the accompanying drawings so that those skilled in the technical field to which the present invention pertains may easily carry out the present invention. However, the present invention may be implemented in various different ways, and is not limited to the exemplary embodiment described herein.

A part irrelevant to the description will be omitted to clearly describe the present invention, and the same or similar constituent elements will be designated by the same reference numerals throughout the specification. In addition, terms or words used in the specification and the claims should not be interpreted as being limited to a general and dictionary meaning and should be interpreted as a meaning and a concept which conform to the technical spirit of the present invention based on a principle that an inventor can appropriately define a concept of a term in order to describe his/her own invention by the best method.

The present invention relates to a locking structure for an armrest, which may include an armrest housing 1a mounted on an armrest bracket 1b coupled to a rear seat to be pivotable to a folded up position with an angle parallel to a backrest 2b, or a pulled down position with an angle parallel to a seat 2a, and hereinafter, an exemplary embodiment of the present invention will be described in detail with reference to the drawings.

Referring to FIGS. 2 to 5, similar to the configuration of the armrest housing in the related art, the armrest housing 1a according to the present invention may include a lower end pivotably coupled to the armrest bracket 1b embedded at a center of the rear seat, and a locking pin 10 disposed at a fixed position in the armrest bracket 1b by a fastening bracket 11 bent in a '⊏' shape.

Further, a fixing bracket 60 may be embedded to be fixedly coupled in the armrest housing 1a, and catches 20 and latches 30 may be pivotably mounted on the fixing bracket 60, respectively. An engaging portion 21 (e.g., recessed to a predetermined depth) may be formed at one side of the catch 20 to allow the locking pin 10 to be inserted into (e.g., enter into) the engaging portion 21, and a recess 23, a projection 22, and a depressed groove 24 may be formed at the opposite side to the side at which the engaging portion 21 is formed. In particular, the projection 22 and the recess 23, which are formed in the catch 20, may be adjacent to each other, the projection 22 may have an inclined surface formed toward the recess 23, and the depressed groove 24, which supports rotation of a protruding portion 31 when the protruding portion 31 is fitted into the depressed groove 24, may be formed opposite to the inclined surface. A catching portion (see FIG. 6) may be formed to have a greater length at one side of the engaging portion 21 to allow the engaging portion 21 to come into direct contact with (e.g., to abut) the locking pin 10 when the armrest housing 1a pivots (as a damper is mounted).

Further, the latch 30 may be pivotably coupled to the fixing bracket 60 when the latch 30 is spaced apart from the catch 20 at a predetermined distance. The protruding portion 31, which has a pointy shape (e.g., a shape which gradually increasing in size from a starting point) to be fitted into the recess 23 or the depressed groove 24 of the catch 20, may be formed at one side (e.g., a first side) of the latch 30, and a wire 41 may be connected to the other side (e.g., a second side) of the latch 30. A knob 40 (as illustrated in FIG. 2) may be mounted to be partially exposed from the armrest housing 1a and the wire 41 may be configured to rotate the latch 30 when the knob 40 is pulled by an occupant or user.

Figure 2:
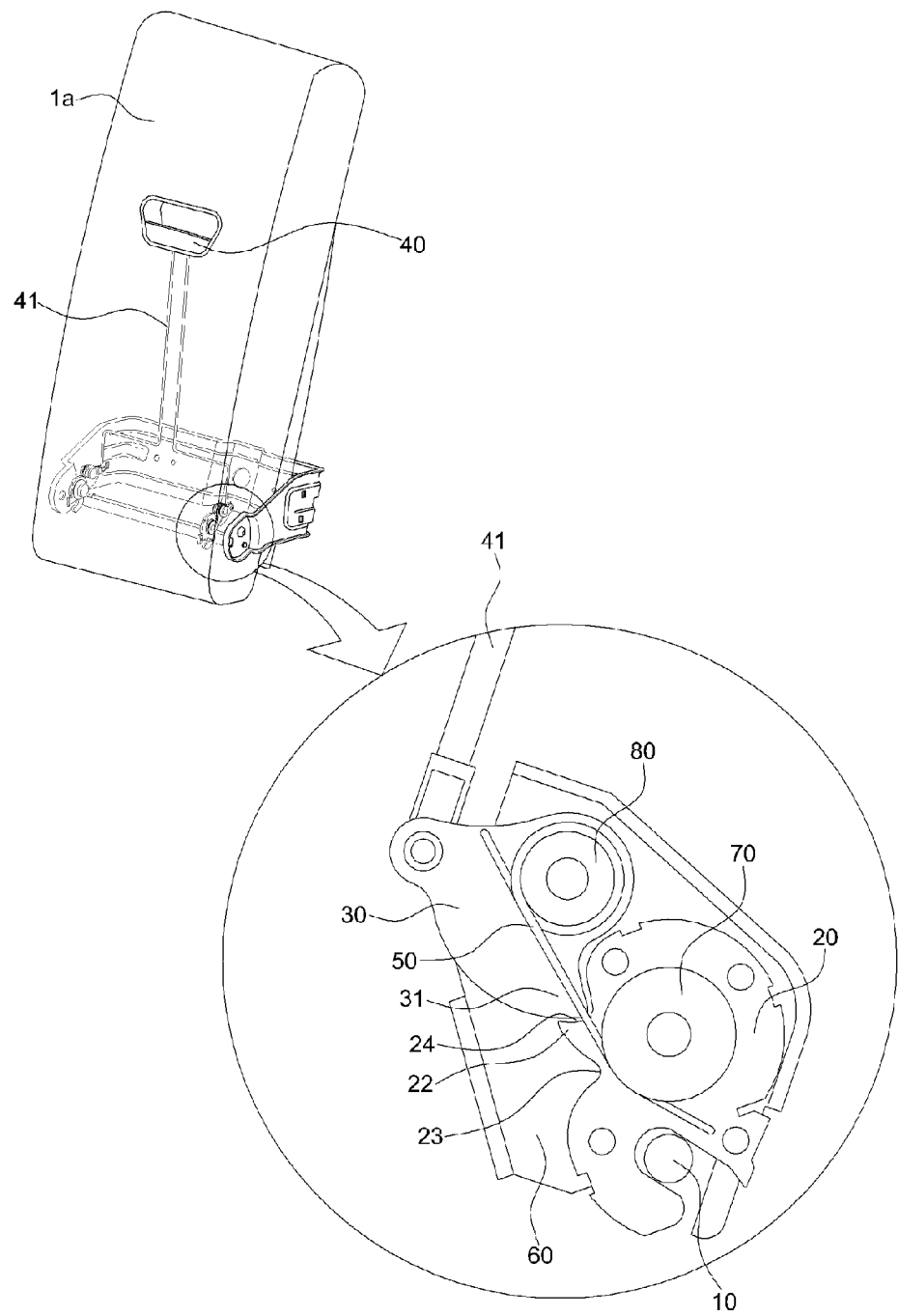
FIG. 2 is a view illustrating a state in which a locking structure for an armrest according to an exemplary embodiment of the present invention is adopted, and a locking pin is caught by a catch when the armrest housing is in the folded up position.
Figure 3:
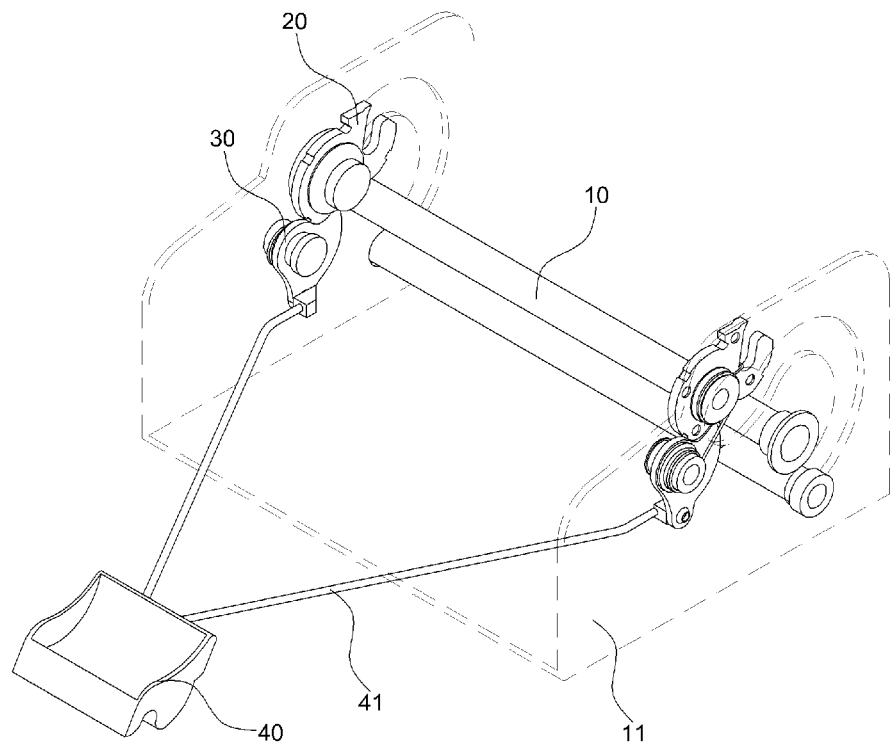
FIG. 3 is a view illustrating a state in which constituent elements (a locking pin, a catch, a latch, and a knob, etc.) according to the exemplary embodiment of the present invention are coupled when the armrest housing and an armrest bracket are removed.
Figure 4A:
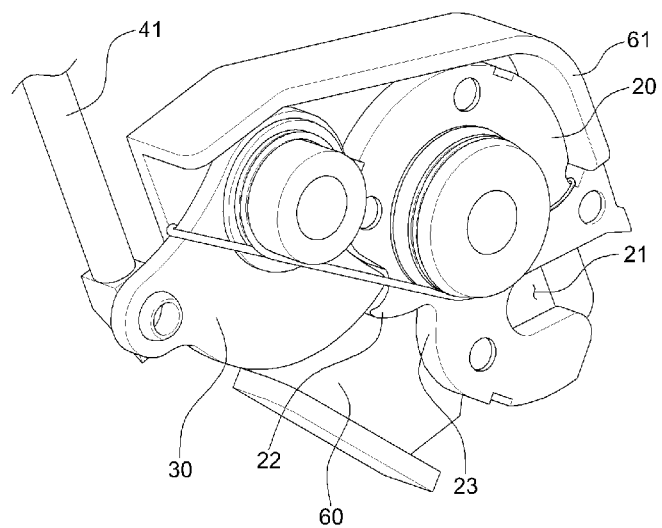
FIG. 4A is a view illustrating a state in which the catch, the latch, and a spring are mounted on a fixing bracket embedded in the armrest housing according to an exemplary embodiment of the present invention.
Figure 4B:
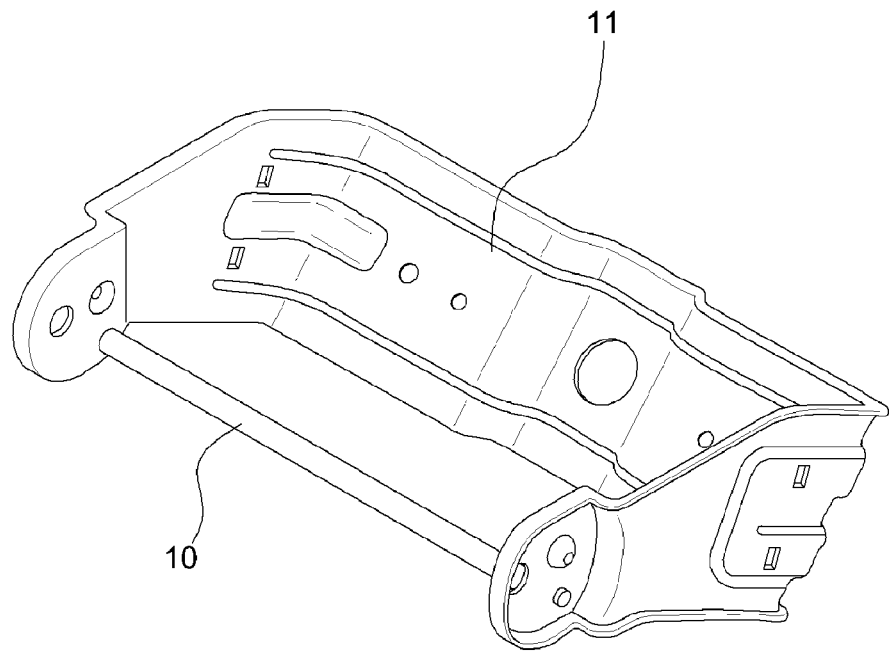
FIG. 4B is a view illustrating a state in which the locking pin mounted on the armrest bracket is fixed to a fastening bracket according to an exemplary embodiment of the present invention.
Figure 5:
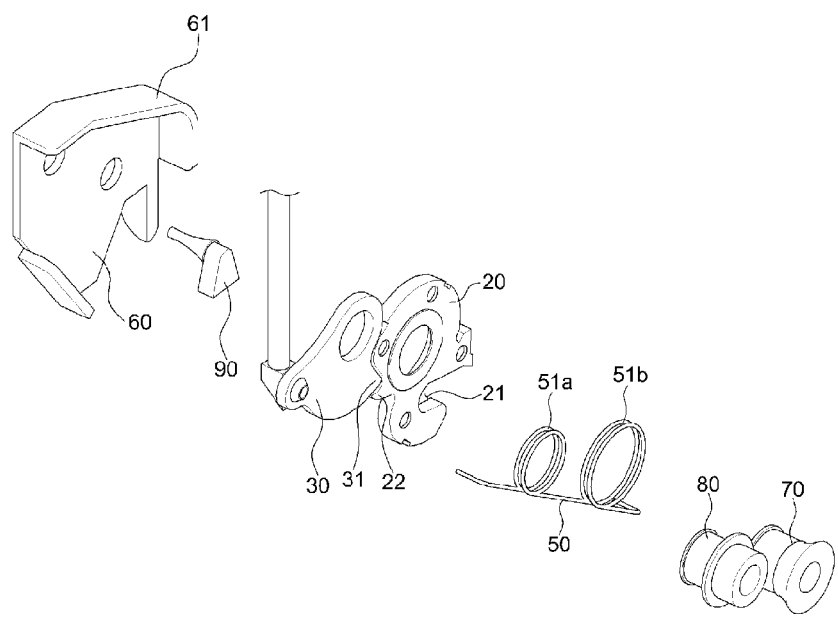
FIG. 5 is a view illustrating a state in which an assembled state illustrated in FIG. 4A is disassembled according to an exemplary embodiment of the present invention.

As illustrated in FIGS. 2 and 3, in the exemplary embodiment of the present invention, one locking pin 10 may be installed on the fastening bracket 11, and the catches 20 and the latches 30 (mounted to mate with the fixing bracket) may be installed at both sides of the fastening bracket 11, respectively, and the wires 41 are connected to the latches 30, respectively. Further, the catch 20 and the latch 30 may be coupled to a spring 50 to maintain a state in which the catch 20 and the latch 30 are rotated to allow the locking pin 10 to be inserted into the engaging portion 21. The spring 50 according to the exemplary embodiment of the present invention may include two coil portions 51a and 51b fitted with a boss 70 operating as a rotation axis of the catch 20 and a boss 80 operating as a rotation axis of the latch 30, respectively, and both ends of the spring 50 may be configured to elastically support rotation of the catch 20 and the latch 30.

Figure 6:
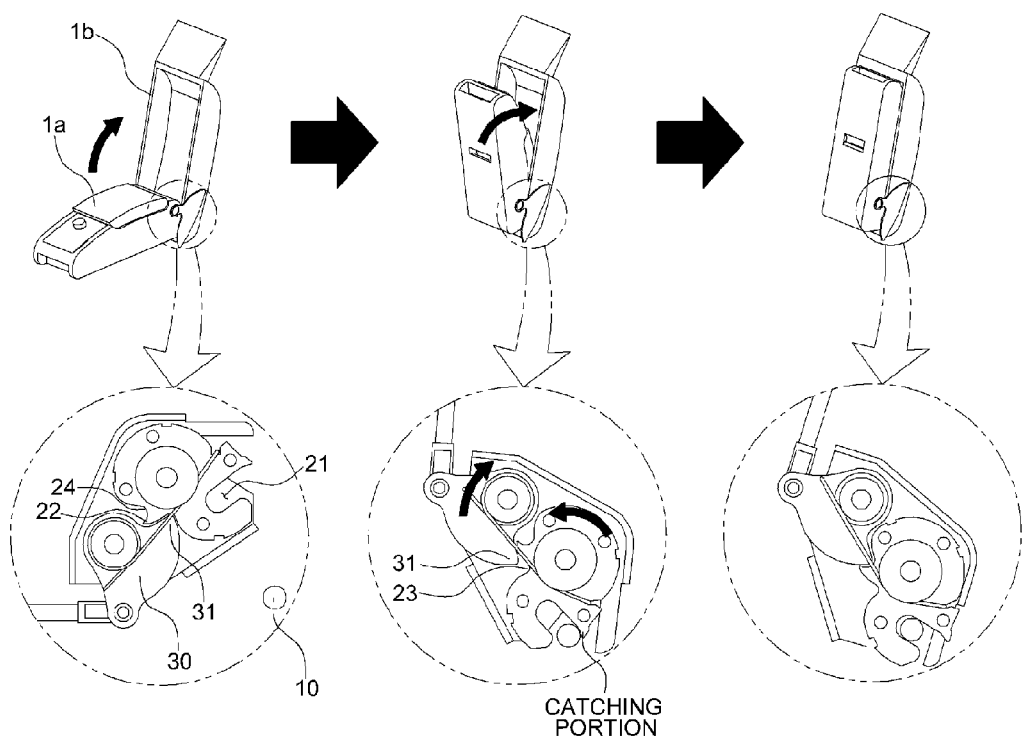
FIG. 6 is a view sequentially illustrating states in which when the armrest housing is rotated from the pulled down position to the folded up position, the catch and the latch are rotated as the locking pin enters an engaging portion, and the catch is locked by the latch according to an exemplary embodiment of the present invention.

According to the present invention having the aforementioned configuration, when the armrest housing 1a is rotated from the pulled down position to the folded up position, the fixing bracket 60 may be entirely rotated by the rotation of the armrest housing 1a when the protruding portion 31 of the latch 30 is fitted into the recess 23 of the catch 20 as illustrated in FIG. 6, causing the catch 20 to approach the locking pin 10. Further, when the locking pin 10 comes into direct contact with (e.g., abuts) the catching portion mounted with the damper, the locking pin 10 may be inserted into (e.g., enter) the engaging portion 21, and simultaneously, the catch 20 may be rotated due to the locked state of the locking pin.

As illustrated, as the catch 20 rotates counterclockwise, the latch 30 may be configured to rotate clockwise and the protruding portion 31 may be withdrawn from the recess 23 and be inserted into the depressed groove 24 while moving along the inclined surface and passing over the projection 22. Since the depressed groove 24 may be formed in a shape that may allow the protruding portion 31 to be fixed by abutting the depressed groove 24, the rotation of the catch 20 may be prevented by the latch 30 when the locking pin 10 is engaged when the armrest housing 1a is fully rotated to the folded up position.

On the contrary, when the armrest housing 1a is rotated from the folded up position to the pulled down position, when the knob 40 is operated to pull the wire 41, the latch 30 may be configured to rotate (clockwise based on the drawings) to withdraw the protruding portion 31 from the depressed groove 24, and the catch 20 may also be rotated by the elastic force of the spring 50 in conjunction with the rotation of the latch 30, and simultaneously, the locking pin 10 may be withdrawn from the engaging portion 21. In other words, in the present invention, when the locking pin 10 enters the engaging portion 21 and the catch 20 rotates, the latch 30 may be configured to rotate to cause the protruding portion 31 to be seated in the depressed groove to support the projection 22 of the catch 20, thereby locking the rotation of the armrest housing 1a, and when the latch 30 is rotated by the operation of the knob and the protruding portion 31 may be withdrawn, the rotation of the armrest housing 1a may be permitted.

Meanwhile, in the present invention, to inhibit the occurrence of a frictional sound or a tapping sound when the locking pin 10 enters the engaging portion 21, the catch 20 may be made of metal, and a damper 90 (see FIG. 5), made of plastic, may be coupled to a portion of the catch 20 with which the locking pin 10 comes into contact when the locking pin 10 is in the engaging portion 21. The damper 90 may be additionally mounted in the vicinity of (e.g., proximate to) the catching portion or installed to constitute the catching portion, thereby inhibiting a tapping sound from being generated when the catch 20 initially comes into direct contact with the locking pin 10.

In addition, to prevent a frictional sound from being generated when the locking pin 10 enters the engaging portion 21 to rotate the catch 20, a tape or a film, made of a material having a smaller frictional coefficient than a material of the locking pin 10, may be wound around a surface of the locking pin 10. Further, a flange 61 may protrude from the fixing bracket 60 to prevent the catch 20, which is rotated when the spring 50 is restored, from being excessively rotated. The catch 20 and the latch 30 may be coupled to the fixing bracket 60 when the catch 20 and the latch 30 are fitted into the cylindrical bosses 70 and 80, respectively, and the bosses 70 and 80 may be mounted to be connected with the spring 50, thereby improving assembling convenience and operability.

Figure 7:
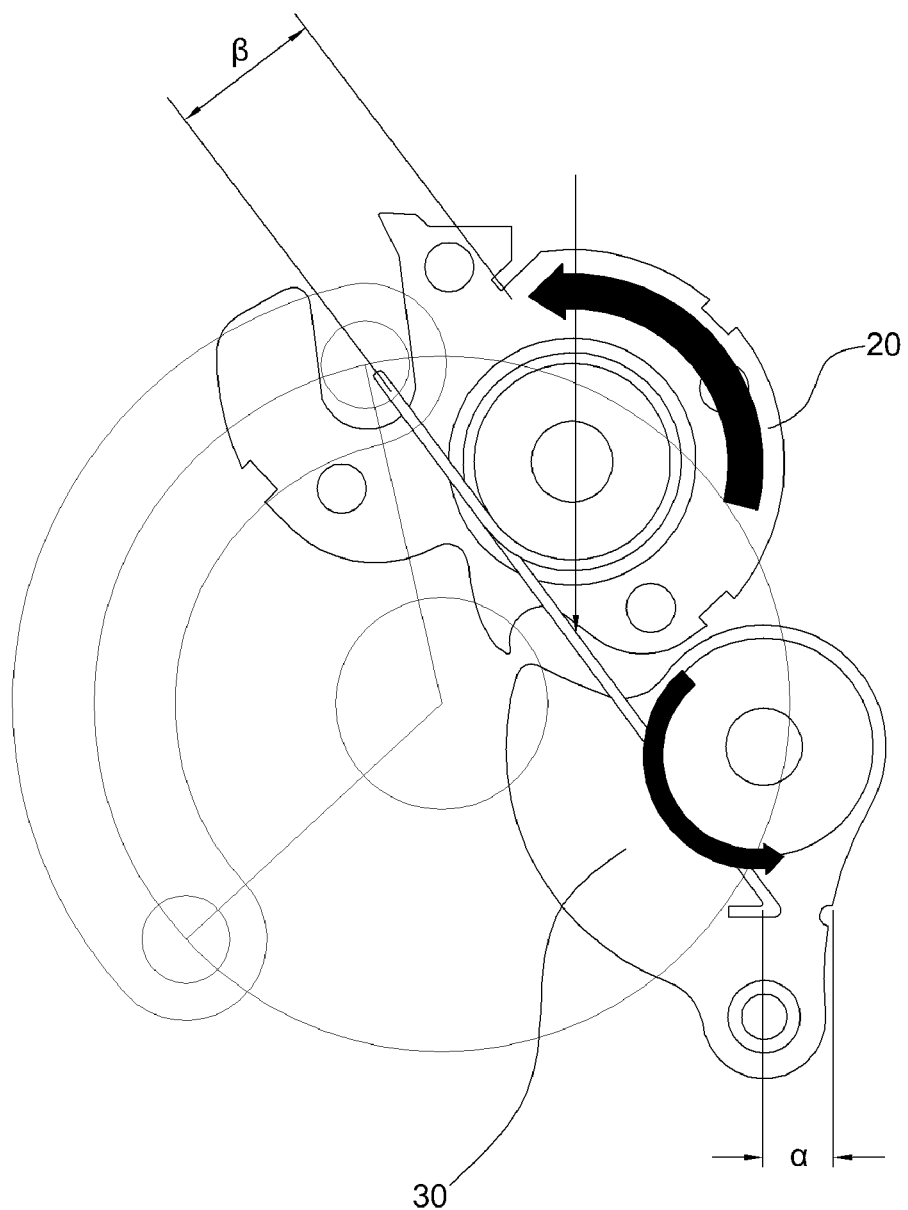
FIG. 7 is a view illustrating a state in which an integrated spring is mounted, and restoring force β of the catch increases as much as a rotation amount a of the latch according to an exemplary embodiment of the present invention.

According to the present invention having the aforementioned configuration, a locking operation may be automatically performed when the armrest housing 1a rotates to the folded up position, thereby preventing a malfunction and releasing the locked state using a smaller amount of force. In addition, the spring 50 according to the present invention may be a spring having a plurality of apertures into which the catch 20 and the latch 30 may be fitted, respectively, and may increase restoring force $\beta$ of the catch as much as a rotation amount $\alpha$ of the latch as illustrated in FIG. 7, and the damper 90 and the film may be additionally mounted, thereby inhibiting the occurrence of the tapping sound and the frictional sound.

The present invention, which has been described above, is not limited by the aforementioned exemplary embodiment and the accompanying drawings, and it is obvious to those skilled in the art to which the present invention pertains that various substitutions, modifications and alterations may be made without departing from the technical spirit of the present invention.

What is claimed is:

1. A locking structure and an armrest having an armrest housing mounted in a rear seat to be pivotable to a folded up position or a pulled down position, the locking structure comprising:
    a locking pin disposed at a fixed position;
    a catch pivotably coupled to a fixing bracket embedded in the armrest housing, and including an engaging portion formed at a first side of the catch to insert the locking pin into the engaging portion, and a projection and a recess formed to be spaced apart from the engaging portion;
    a latch pivotably coupled to the fixing bracket when the latch is spaced apart from the catch, and including a protruding portion formed at a first side of the latch; and
    a knob configured to rotate the latch by a wire,
    wherein when the armrest housing rotates to the folded up position, the catch rotates while the locking pin enters the engaging portion, and the latch rotates to cause the protruding portion to support the projection of the catch to lock rotation of the armrest housing, and when the latch is rotated by an operation of the knob, the locking pin is withdrawn from the catch, to permit the rotation of the armrest housing.

2. The locking structure of claim 1, wherein the catch is coupled to a spring to maintain a state in which the catch is rotated to allow the locking pin to enter the engaging portion when the armrest housing is rotated.

3. The locking structure of claim 2, wherein the spring includes two coil portions fitted with a rotation axis of the catch and a rotation axis of the latch, respectively, and both ends of the spring are configured to elastically support rotations of the catch and the latch, respectively.

4. The locking structure of claim 2, wherein the projection and the recess are adjacent to each other, the projection has an inclined surface formed toward the recess, a depressed groove, which supports rotation of a protruding portion when the protruding portion is fitted into the depressed groove, is formed opposite to the inclined surface, and the protruding portion is fitted into the recess when the catch is rotated to allow the locking pin to enter the engaging portion.

5. The locking structure of claim 4, wherein when the catch rotates and the locking pin is in the engaging portion, the protruding portion slides along the inclined surface, and the protruding portion is seated in the depressed groove to prevent rotation of the catch.

6. The locking structure of claim 5, wherein the catch is made of metal, and a damper, which is made of plastic, is coupled to a portion of the catch with which the locking pin comes into contact when the locking pin is in the engaging portion.

7. The locking structure of claim 6, wherein a tape, which is made of a material having a smaller frictional coefficient than a material of the locking pin, is coupled to a surface of the locking pin to prevent a frictional sound from being generated when the locking pin enters the engaging portion and the catch rotates.

8. The locking structure of claim 6, wherein a flange protrudes from a rim of the fixing bracket to restrict a maximum rotation range of the catch.

* * * * *